United States Patent [19]
Seiden

[11] Patent Number: 5,860,473
[45] Date of Patent: Jan. 19, 1999

[54] MULTI-ZONE AUTOMATIC CHANGEOVER HEATING, COOLING AND VENTILATING CONTROL SYSTEM

[75] Inventor: Lewis Jim Seiden, Tappan, N.Y.

[73] Assignee: Trol-A-Temp Division of Trolex Corp., Elmwood Park, N.J.

[21] Appl. No.: 274,096

[22] Filed: Jul. 12, 1994

[51] Int. Cl.[6] ............................................ F25B 29/00
[52] U.S. Cl. ...................... 165/208; 165/209; 165/217; 236/49.3; 236/1 B; 236/1 C; 236/11
[58] Field of Search ..................... 236/1 B, 1 C, 236/49.3, 11; 165/217, 208, 209

[56] References Cited

U.S. PATENT DOCUMENTS

| | | | |
|---|---|---|---|
| 4,369,916 | 1/1983 | Abbey | 236/11 |
| 4,530,395 | 7/1985 | Parker et al. | 236/1 C |
| 4,646,964 | 3/1987 | Parker et al. | 236/1 B |
| 4,673,029 | 6/1987 | Beachboard | 236/1 B |
| 4,716,957 | 1/1988 | Thompson et al. | 236/1 B |
| 4,819,716 | 4/1989 | Beachboard | 236/1 B |
| 4,830,095 | 5/1989 | Friend | 236/1 B |
| 4,890,666 | 1/1990 | Clark | 165/208 |
| 4,897,798 | 1/1990 | Cler | 364/557 |
| 4,931,948 | 6/1990 | Parker et al. | 165/208 |
| 4,997,030 | 3/1991 | Goto et al. | 236/51 |
| 5,076,346 | 12/1991 | Otsuka | 236/1 B |
| 5,092,394 | 3/1992 | Foster | 236/49.3 |
| 5,161,608 | 11/1992 | Osheroff | 236/1 C |
| 5,245,835 | 9/1993 | Cohen et al. | 165/208 |
| 5,303,767 | 4/1994 | Riley | 165/208 |
| 5,318,104 | 6/1994 | Shah et al. | 165/208 |

OTHER PUBLICATIONS

Key Systems For Commercial Buildings, Publication of Carrier Corporation, 1986, pp. 1–46.

*Primary Examiner*—John K. Ford
*Attorney, Agent, or Firm*—Collen Law Associates

[57] ABSTRACT

A climate control system having a control means for receiving cool call signals and heat call signals from a plurality of thermostats. The control means blocking action by conflicting calls when the system is in a heat mode or cool mode. The system also preventing a single zone from dominating the mode of the control system and allow a conflicting call to be received after the control system has been in a particular mode for a maximum period or the conflicting call has been waiting for longer than a maximum period. The control system also properly adjusting the dampers to allow purging of ducts after heating and cooling mode and to allow zone or system ventilation upon request.

16 Claims, 19 Drawing Sheets

Typical Zone Thermostat Circuit

MCM Circuits

MCM Timer Module

TIMING DIAGRAM

Damper Motor Control Circuit

FAN Mode Control

*Fig. 7*   MCM Equipment Control

Hydronic Control

```
MODE PURGE                    FAN ON
ZONE 1        STAT OFF        DAMPER OPENED {O:F=Instl}*
ZONE 2        STAT OFF        DAMPER CLOSED {C:F=Instl}*
ZONE 3        STAT OFF        DAMPER CLOSED {O:Z=Instl}*
ZONE 4        STAT OFF        DAMPER OPENED {O:Z=Instl}*
   Purge mode wait . . .
MODE PURGE    BIAS HEAT       FAN ON
ZONE 1        STAT OFF        DAMPER OPENED {O:F=Instl}*
ZONE 2        STAT OFF        DAMPER CLOSED {C:F=Instl}*
ZONE 3        STAT OFF        DAMPER CLOSED {C:Z=Instl}*
ZONE 4        STAT OFF        DAMPER OPENED {O:Z=Instl}*
   Bias mode still on.
ZONE # 1 HEAT call entered.
MODE HEAT                     FAN OFF
ZONE 1        STAT HEAT       DAMPER OPENED {O:F=Instl}*< call
ZONE 2        STAT OFF        DAMPER CLOSED {C:F=Instl}*
ZONE 3        STAT OFF        DAMPER CLOSED {C:Z=Instl}*
ZONE 4        STAT OFF        DAMPER CLOSED {O:Z=Instl}
MODE HEAT                     FAN OFF
ZONE 1        STAT HEAT       DAMPER OPENED {O:F=Instl}*< call
ZONE 2        STAT OFF        DAMPER CLOSED {C:F=Instl}*
ZONE 3        STAT OFF        DAMPER CLOSED {C:Z=Instl}*
ZONE 4        STAT OFF        DAMPER CLOSED {O:Z=Instl}
MODE HEAT                     FAN OFF
ZONE 1        STAT HEAT       DAMPER OPENED {O:F=Instl}*< call
ZONE 2        STAT OFF        DAMPER CLOSED {C:F=Instl}*
ZONE 3        STAT OFF        DAMPER CLOSED {C:Z=Instl}*
ZONE 4        STAT OFF        DAMPER CLOSED {O:Z=Instl}
ZONE # 1 OFF call entered.
MODE PURGE                    FAN ON
ZONE 1        STAT OFF        DAMPER OPENED {O:F=Instl}* <last zone
ZONE 2        STAT OFF        DAMPER CLOSED {C:F=Instl}*
ZONE 3        STAT OFF        DAMPER CLOSED {C:Z=Instl}*
ZONE 4        STAT OFF        DAMPER CLOSED {O:Z=Instl}
   Purge mode wait . . .
MODE purge    BIAS COOL       FAN ON
ZONE 1        STAT OFF        DAMPER OPENED {O:F=Instl}* <last zone
ZONE 2        STAT OFF        DAMPER CLOSED {C:F=Instl}*
ZONE 3        STAT OFF        DAMPER CLOSED {C:Z=Instl}*
ZONE 4        STAT OFF        DAMPER CLOSED {O:Z=Instl}
```

*FIG. 10A*

Bias mode still on.
ZONE # 2 COOL call entered.

| | | |
|---|---|---|
| MODE COOL | | FAN ON |
| ZONE 1 | STAT OFF | DAMPER CLOSED {O:F=Instl} |
| ZONE 2 | STAT COOL | DAMPER OPENED {C:F=Instl} < call |
| ZONE 3 | STAT OFF | DAMPER CLOSED {C:Z=Instl}* |
| ZONE 4 | STAT OFF | DAMPER CLOSED {O:Z=Instl} |

ZONE # 3 HEAT call entered.

| | | |
|---|---|---|
| MODE COOL | | FAN ON |
| ZONE 1 | STAT OFF | DAMPER CLOSED {O:F=Instl} |
| ZONE 2 | STAT COOL | DAMPER OPENED {C:F=Instl} < call |
| ZONE 3 | STAT HEAT | DAMPER CLOSED {C:Z=Instl}* |
| ZONE 4 | STAT OFF | DAMPER CLOSED {O:Z=Instl} |
| MODE COOL | | FAN ON |
| ZONE 1 | STAT OFF | DAMPER CLOSED {O:F=Instl} |
| ZONE 2 | STAT COOL | DAMPER OPENED {C:F=Instl} < call |
| ZONE 3 | STAT HEAT | DAMPER CLOSED {C:Z=Instl}* |
| ZONE 4 | STAT OFF | DAMPER CLOSED {O:Z=Instl} |
| MODE COOL | | FAN ON |
| ZONE 1 | STAT OFF | DAMPER CLOSED {O:F=Instl} |
| ZONE 2 | STAT COOL | DAMPER OPENED {C:F=Instl} < call |
| ZONE 3 | STAT HEAT | DAMPER CLOSED {C:Z=Instl}* |
| ZONE 4 | STAT OFF | DAMPER CLOSED {O:Z=Instl} |
| MODE COOL | | FAN ON |
| ZONE 1 | STAT OFF | DAMPER CLOSED {O:F=Instl} |
| ZONE 2 | STAT COOL | DAMPER OPENED {C:F=Instl} < call |
| ZONE 3 | STAT HEAT | DAMPER CLOSED {C:Z=Instl}* |
| ZONE 4 | STAT OFF | DAMPER CLOSED {O:Z=Instl} |
| MODE COOL | | FAN ON |
| ZONE 1 | STAT OFF | DAMPER CLOSED {O:F=Instl} |
| ZONE 2 | STAT COOL | DAMPER OPENED {C:F=Instl} < call |
| ZONE 3 | STAT HEAT | DAMPER CLOSED {C:Z=Instl}* |
| ZONE 4 | STAT OFF | DAMPER CLOSED {O:Z=Instl} |

Time cut off of MODE

| | | |
|---|---|---|
| MODE PURGE | | FAN ON |
| ZONE 1 | STAT OFF | DAMPER CLOSED {O:F=Instl} |
| ZONE 2 | STAT COOL | DAMPER OPENED {C:F=Instl} <last zone |
| ZONE 3 | STAT HEAT | DAMPER CLOSED {C:Z=Instl}* |
| ZONE 4 | STAT OFF | DAMPER CLOSED {O:Z=Instl} |

*FIG. 10B*

```
Purge mode wait . . .
MODE purge     BIAS HEAT           FAN ON ZONE 1      STAT OFF
DAMPER CLOSED {O:F=Instl}
ZONE 2         STAT COOL           DAMPER OPENED {C:F=Instl} <last zone
ZONE 3         STAT HEAT           DAMPER CLOSED {C:Z=Instl}*
ZONE 4         STAT OFF            DAMPER CLOSED {O:Z=Instl}
  Bias mode still on.
MODE HEAT                          FAN OFF
ZONE 1         STAT OFF            DAMPER CLOSED {O:F=Instl}
ZONE 2         STAT COOL           DAMPER CLOSED {C:F=Instl}*
ZONE 3         STAT HEAT           DAMPER OPENED {C:Z=Instl}< call
ZONE 4         STAT OFF            DAMPER CLOSED {O:Z=Instl}
MODE HEAT                          FAN OFF
ZONE 1         STAT OFF            DAMPER CLOSED {O:F=Instl}
ZONE 2         STAT COOL           DAMPER CLOSED {C:F=Instl}*
ZONE 3         STAT HEAT           DAMPER OPENED {C:Z=Instl}< call
ZONE 4         STAT OFF            DAMPER CLOSED {O:Z=Instl}
ZONE #  2 OFF call entered.
MODE HEAT                          FAN OFF
ZONE 1         STAT OFF            DAMPER CLOSED {O:F=Instl}
ZONE 2         STAT OFF            DAMPER CLOSED {C:F=Instl}*
ZONE 3         STAT HEAT           DAMPER OPENED {C:Z=Instl}< call
ZONE 4         STAT OFF            DAMPER CLOSED {O:Z=Instl}
MODE HEAT                          FAN OFF
ZONE 1         STAT OFF            DAMPER CLOSED {O:F=Instl}
ZONE 2         STAT OFF            DAMPER CLOSED {C:F=Instl}*
ZONE 3         STAT HEAT           DAMPER OPENED {C:Z=Instl}< call
ZONE 4         STAT OFF            DAMPER CLOSED {O:Z=Instl}
MODE HEAT                          FAN OFF
ZONE 1         STAT OFF            DAMPER CLOSED {O:F=Instl}
ZONE 2         STAT OFF            DAMPER CLOSED {C:F=Instl}*
ZONE 3         STAT HEAT           DAMPER OPENED {C:Z=Instl}< call
ZONE 4         STAT OFF            DAMPER CLOSED {O:Z=Instl}
ZONE #  3 OFF call entered.
MODE PURGE                         FAN ON
ZONE 1         STAT OFF            DAMPER CLOSED {O:F=Instl}
ZONE 2         STAT OFF            DAMPER CLOSED {C:F=Instl}*
ZONE 3         STAT OFF            DAMPER OPENED {C:Z=Instl} <last zone
ZONE 4         STAT OFF            DAMPER CLOSED {O:Z=Instl}
  Purging mode wait . . .
```

*FIG. 10C*

| | | |
|---|---|---|
| MODE purge | BIAS COOL | FAN ON |
| ZONE 1 | STAT OFF | DAMPER CLOSED {O:F=Instl} |
| ZONE 2 | STAT OFF | DAMPER CLOSED {C:F=Instl}* |
| ZONE 3 | STAT OFF | DAMPER OPENED {C:Z=Instl} <last zone |
| ZONE 4 | STAT OFF | DAMPER CLOSED {O:Z=Instl} |

Bias mode still on.

| | | |
|---|---|---|
| MODE purge | BIAS COOL | FAN ON |
| ZONE 1 | STAT OFF | DAMPER CLOSED {O:F=Instl} |
| ZONE 2 | STAT OFF | DAMPER CLOSED {C:F=Instl}* |
| ZONE 3 | STAT OFF | DAMPER OPENED {C:Z=Instl} <last zone |
| ZONE 4 | STAT OFF | DAMPER CLOSED {O:Z=Instl} |

Bias mode done.

| | | |
|---|---|---|
| MODE IDLE | | FAN OFF |
| ZONE 1 | STAT OFF | DAMPER OPENED {O:F=Instl}* |
| ZONE 2 | STAT OFF | DAMPER CLOSED {C:F=Instl}* |
| ZONE 3 | STAT OFF | DAMPER CLOSED {C:Z=Instl}* |
| ZONE 4 | STAT OFF | DAMPER OPENED {O:Z=Instl}* |

ZONE # 1 FAN call entered.

| | | |
|---|---|---|
| MODE FAN | | FAN ON |
| ZONE 1 | STAT FAN | DAMPER OPENED {O:F=Instl}*< call |
| ZONE 2 | STAT OFF | DAMPER CLOSED {C:F=Instl}* |
| ZONE 3 | STAT OFF | DAMPER CLOSED {C:Z=Instl}* |
| ZONE 4 | STAT OFF | DAMPER OPENED {O:Z=Instl}* |
| MODE FAN | | FAN ON |
| ZONE 1 | STAT FAN | DAMPER OPENED {O:F=Instl}*< call |
| ZONE 2 | STAT OFF | DAMPER CLOSED {C:F=Instl}* |
| ZONE 3 | STAT OFF | DAMPER CLOSED {C:Z=Instl}* |
| ZONE 4 | STAT OFF | DAMPER OPENED {O:Z=Instl}* |
| MODE FAN | | FAN ON |
| ZONE 1 | STAT FAN | DAMPER OPENED {O:F=Instl}*< call |
| ZONE 2 | STAT OFF | DAMPER CLOSED {C:F=Instl}* |
| ZONE 3 | STAT OFF | DAMPER CLOSED {C:Z=Instl}* |
| ZONE 4 | STAT OFF | DAMPER OPENED {O:Z=Instl}* |

ZONE # 1 OFF call entered.

| | | |
|---|---|---|
| MODE IDLE | | FAN OFF |
| ZONE 1 | STAT OFF | DAMPER OPENED {O:F=Instl}* |
| ZONE 2 | STAT OFF | DAMPER CLOSED {C:F=Instl}* |
| ZONE 3 | STAT OFF | DAMPER CLOSED {C:Z=Instl}* |
| ZONE 4 | STAT OFF | DAMPER OPENED {O:Z=Instl}* |
| MODE IDLE | | FAN OFF |

*FIG. 10D*

| | | |
|---|---|---|
| ZONE 1 | STAT OFF | DAMPER OPENED {O:F=Instl}* |
| ZONE 2 | STAT OFF | DAMPER CLOSED {C:F=Instl}* |
| ZONE 3 | STAT OFF | DAMPER CLOSED {C:Z=Instl}* |
| ZONE 4 | STAT OFF | DAMPER OPENED {O:Z=Instl}*ZONE # 3 |

FAN call entered.

| | | |
|---|---|---|
| MODE ZONE | | FAN ON |
| ZONE 1 | STAT OFF | DAMPER CLOSED {O:F=Instl} |
| ZONE 2 | STAT OFF | DAMPER CLOSED {C:F=Instl}* |
| ZONE 3 | STAT FAN | DAMPER OPENED {C:Z=Instl} |
| ZONE 4 | STAT OFF | DAMPER CLOSED {O:Z=Instl} |
| MODE ZONE | | FAN ON |
| ZONE 1 | STAT OFF | DAMPER CLOSED {O:F=Instl} |
| ZONE 2 | STAT OFF | DAMPER CLOSED {C:F=Instl}* |
| ZONE 3 | STAT FAN | DAMPER OPENED {C:Z=Instl} |
| ZONE 4 | STAT OFF | DAMPER CLOSED {O:Z=Instl} |

ZONE # 2 FAN call entered.

| | | |
|---|---|---|
| MODE ZONE | | FAN ON |
| ZONE 1 | STAT OFF | DAMPER CLOSED {O:F=Instl} |
| ZONE 2 | STAT FAN | DAMPER OPENED {C:F=Instl} |
| ZONE 3 | STAT FAN | DAMPER OPENED {C:Z=Instl} |
| ZONE 4 | STAT OFF | DAMPER CLOSED {O:Z=Instl} |
| MODE ZONE | | FAN ON |
| ZONE 1 | STAT OFF | DAMPER CLOSED {O:F=Instl} |
| ZONE 2 | STAT FAN | DAMPER OPENED {C:F=Instl} |
| ZONE 3 | STAT FAN | DAMPER OPENED {C:Z=Instl} |
| ZONE 4 | STAT OFF | DAMPER CLOSED {O:Z=Instl} |

ZONE # 3 OFF call entered.

| | | |
|---|---|---|
| MODE FAN | | FAN ON |
| ZONE 1 | STAT OFF | DAMPER OPENED {O:F=Instl}* |
| ZONE 2 | STAT FAN | DAMPER OPENED {C:F=Instl}< call |
| ZONE 3 | STAT OFF | DAMPER CLOSED {C:Z=Instl}* |
| ZONE 4 | STAT OFF | DAMPER OPENED {O:Z=Instl}* |
| MODE FAN | | FAN ON |
| ZONE 1 | STAT OFF | DAMPER OPENED {O:F=Instl}* |
| ZONE 2 | STAT FAN | DAMPER OPENED {C:F=Instl}< call |
| ZONE 3 | STAT OFF | DAMPER CLOSED {C:Z=Instl}* |
| ZONE 4 | STAT OFF | DAMPER OPENED {O:Z=Instl}* |
| MODE FAN | | FAN ON |
| ZONE 1 | STAT OFF | DAMPER OPENED {O:F=Instl}* |
| ZONE 2 | STAT FAN | DAMPER OPENED {C:F=Instl}< call |

*FIG. 10E*

| | | |
|---|---|---|
| ZONE 3 | STAT OFF | DAMPER CLOSED {C:Z=Instl}* |
| ZONE 4 | STAT OFF | DAMPER OPENED {O:Z=Instl}* |
| ZONE # 2 OFF call entered. | | |
| MODE IDLE | | FAN OFF |
| ZONE 1 | STAT OFF | DAMPER OPENED {O:F=Instl}* |
| ZONE 2 | STAT OFF | DAMPER CLOSED {C:F=Instl}* |
| ZONE 3 | STAT OFF | DAMPER CLOSED {C:Z=Instl}* |
| ZONE 4 | STAT OFF | DAMPER OPENED {O:Z=Instl}* |
| MODE IDLE | | FAN OFF |
| ZONE 1 | STAT OFF | DAMPER OPENED {O:F=Instl}* |
| ZONE 2 | STAT OFF | DAMPER CLOSED {C:F=Instl}* |
| ZONE 3 | STAT OFF | DAMPER CLOSED {C:Z=Instl}* |
| ZONE 4 | STAT OFF | DAMPER OPENED {O:Z=Instl}* |

*FIG. 10F*

MULTI-ZONE AUTOMATIC CHANGEOVER HEATING, COOLING AND VENTILATING CONTROL SYSTEM

FIELD OF THE INVENTION

The present invention relates to a control Panel for a multi-zone system which allows automatic changeover between Heating and Cooling, or visa-versa, on a per zone basis. The control prevents conflicting calls from reaching the equipment or the air distribution damper system. It provides equipment protection by normalizing the equipment and air distribution system by means for purging the system with the fan between calls as well as after a power failure. The system provides for a temperature comfort range, rather than a single set point, in each individual zone utilizing simple thermostats in the zone. Each zone is satisfied, either by reaching the desired temperature or being cutoff by a time limit on a mode of operation. The control provides a preference for the opposite mode after the Purge. In addition to these basic functions the panel provides for either total system or zoned ventilation. The system operates single stage Heating & Cooling equipment, or with an auxiliary panel, two stage, or Heat pump equipment; with single or multiple fans or speeds. The present invention can also control Hydronic valves in each zone, for first stage or second stage heating.

BACKGROUND OF THE INVENTON

Heating Ventilating and Air Conditioning (HVAC) systems are well known. These systems typically use forced air to heat, cool and ventilate an area, zone or room. A heater and a cooler is provided which can heat or cool or just circulate the air, and the air is sent to each zone by means of damper controlled ducts and a fan.

U.S. Pat. 4,530,395 as well as 4,931,948 to Parker et al describes a single zone HVAC controlled for operation in multiple zone arrangement utilizing a variable volume air distribution method. In this system there is need for computerized thermostats in addition to the central control system 10 for the HVAC equipment In addition, the modulating dampers are directly controlled by the computerized thermostats. This system bases its control by voting on which mode of energy or type of air to supply to a zone. Many such systems base the control of the damper by the thermostat directly and therefore require a delivered air temperature sensor in the damper to decide whether to open or close the damper. The voting is then done by feeding the thermostat information back to the central control equipment. Such systems are usually very costly and can still starve a minority zone.

U.S. Pat. No. 5,092,394 to Foster and assigned to the present assignee, describes a switching panel and system for controlling zone heating and cooling systems. This reference only controls a manually selected mode, either the heating or the cooling. The system cannot satisfy a zone calling for cooling while the system is in the heat mode even if there is no present heat call or visa-versa.

Most of the prior art systems require a manual mode change to determine if they will control either the heating or the cooling, but cannot operate sequentially using automatic changeover based on the zone requirement. There are some other systems which automatically change to the other mode based on an outdoor or building-wide sensing device. However, they are based on separate thermostats, such as a thermostat in the system return air duct, or outside of the building. There are also some systems which use a voting or counting method of the individual zones. However, none of these systems can satisfy each of the zones in turn, when there are conflicting calls, nor do they provide the equipment protection in the simple manner to be described.

Many patents, such as U.S. Pat. No. 4,997,030, assigned to Toshiba, describe the control of a variable air volume system which is based on the principle of allowing air into a zone via a modulating damper controlled duct when the zone is above or below the set point which matches the temperature of the delivered air. It then limits the amount of air until the damper is closed when the zone temperature exceeds the differential. This method assumes that the duct is the source of the energy and that the zone will only dissipate that energy. If the source of the energy is within the zone such as many electrical appliances or enters via another route, such as sunny windows, the control system does not always provide a comfort range control.

U.S. Pat. No. 4,897,798 assigned to AT&T, attempts to adapt the set point of the system based on the thermal properties of the building.

In each case there is an attempt to emulate an individual set of equipment for each zone. The purpose of the system to be described, is to allow each zone to demand its own comfort range while insuring that no zone is ignored.

SUMMARY AND OBJECTS OF THE INVENTION

The present invention is a control system for a heating and cooling control system where zones calling for heat and those calling for cooling can be satisfied sequentially without manual intervention. The present invention provides the controls to allow use of one set of ducts to each zone with the heater and the cooler connected to these sets of ducts. Each zone has dampers in the ducts in order to control the air flow between the ducts and the zone. The present invention is also able to provide ventilation to the zones, either on a zoned or system-wide basis when the more important call for heat or cool is not present.

The present invention provides all these abilities by controlling the heater, cooler, fan and dampers in such a way that heat is only supplied to those zone calling for heat cooling is only supplied to those zones calling for cooling, and ventilation is supplied to all zones calling for ventilation when neither heat calls or cool calls are present. The present invention accomplishes this by controlling the heater, cooler, fan and dampers so that when hot air is being sent through the ducts, it is only directed to those zones calling for heat, and when cool air is being sent through the ducts, it is only provided to those zones calling for cooling. Likewise, ventilation air is only sent through the ducts to those zones calling for ventilation. The present invention also prevents conflicting calls from operating the heating and cooling equipment at the same time. The types of calls are prioritized so that heating or cooling will override a ventilation call. Means are also provided so that a heating or cooling call does not completely dominate the system, and prevent conflicting calls from being satisfied. It further protects the equipment by normalizing each equipment with a purge of the system between calls.

The present invention accomplishes all of these objects by having a comfort range thermostat in each zone connected to the control panel means, with the control panel means also connected to the heater, cooler, fans and dampers. The control panel means of the present invention, has a master control module and a multi-zone or series of multi-zone panels. The multi-zone panel controls basic operations such as receiving calls from thermostats and opening and closing dampers. The master control module controls higher level operations such as blocking conflicting calls preventing domination by a single call providing fan operation for the purge, and providing the bias for the opposite mode. In the preferred embodiment, each multi-zone panel which controls three zones with a plurality of multi-zone panels being connected together if more than three zones are to be controlled.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS In the drawings:

FIG. 10A–10F is a listing of the status of individual portions of a multi-zone dual heating and cooling system showing how the status of the individual parts of the system change;

DETAILED DESCRIPTION OF THE PREFERRED EMBODIMENT

Figure 1:
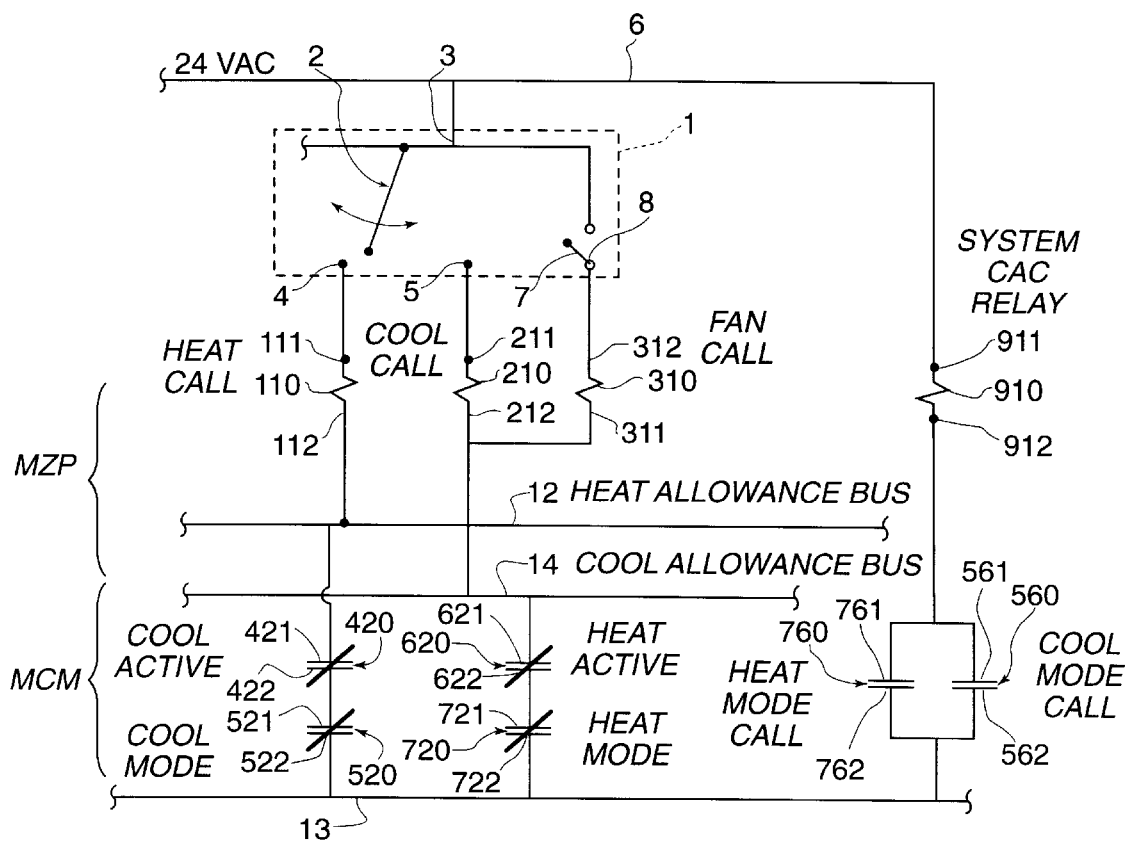
FIG. 1 is a circuit diagram of thermostat and part of the master control module of the present invention.

Referring to the drawings, and in particular to FIG. 1, the present invention is preferably embodied using relays to carry out the objectives. In the drawings, the relays are represented using symbols that are the common and preferred symbols used in military specifications. The symbol containing the two short parallel lines represent a contact set of the relay. One of the short parallel lines represent a first terminal and the other parallel line represent a second terminal. When the two short parallel lines have a diagonal line crossing both of the two parallel lines, the contact set represents a normally closed contact set, where the first and second terminals are electrically connected to each other when the relay is not energized. When there is no diagonal line across the two short parallel lines, the symbol represents a normally open contact set where the first and second terminals are not connected when the coil of the relay is not energized, and the first and second terminals are electrically connected when the coil is energized. The coil of the relay is represented by a jagged symbol and the relay is energized when current passes through the coil.

In FIG. 1, a thermostat 1 has a temperature switching means 2 which switches a first power terminal 3 to a heat call terminal 4 when the temperature in the zone is below a first predetermined value. The temperature switching means 2 also electrically connects first power terminal 3 to cool call terminal 5 when the temperature is above a second predetermined value. The first power terminal 3 is always connected to one of two power lines, and in the preferred embodiment, the power line is a 24 volt AC line 6. There is a fixed, or variable comfort range in the thermostat 1. The thermostat 1 can also have a fan switch means for electrically connecting and disconnecting a fan call terminal 8 with the first power terminal 3. Some thermostats also have a connection to allow an automatic fan call when the cool call is made (not shown). This condition has been taken into account and is not a problem to the present invention.

Figure 11:
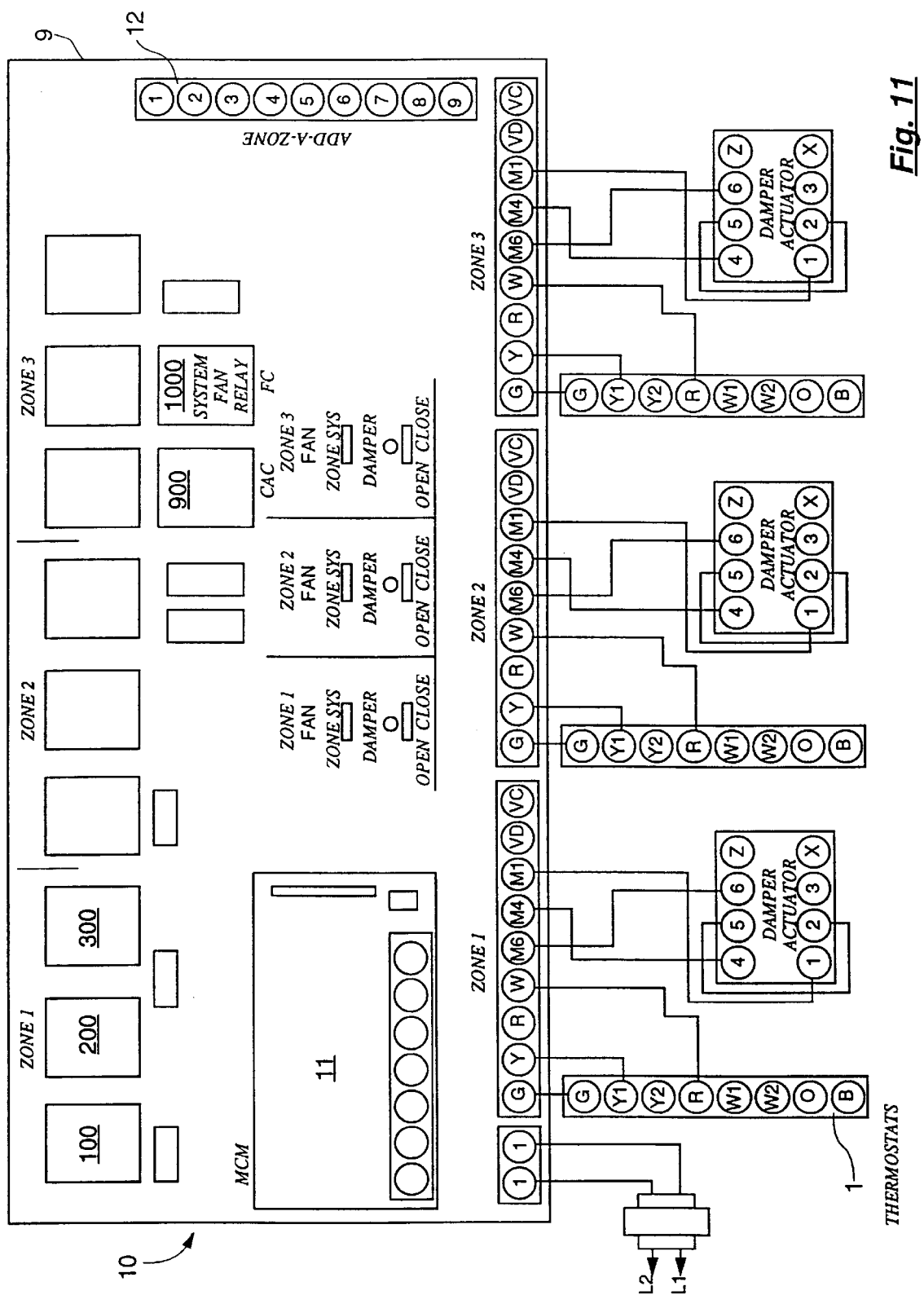
FIG. 11 is a plan view of the control means of the present invention.

Thermostats are located in each zone. All of these thermostats are wired, as shown in FIG. 11, to a control means 10. The control means 10 contains a multi-zone panel 9 and a master control module 11 which is mounted on the multi-zone panel 9. Several multi-zone panels 9 can be connected together through the add-a-zone terminal strip 12. Only one master control module 11 is needed in a system and can be located on any one of the multi-zone panels 9.

The multi-zone panel contains a zone heat call relay 100, a zone cool call relay 200 and a zone fan call relay 300. The zone heat call relay 100 has a coil 110 with a first terminal 111 connected to the heat call terminal 4 of the respective zone thermostat 1. The coil 110 has a second coil terminal 112 which is connected to the heat allowance bus 12.

Figure 12:
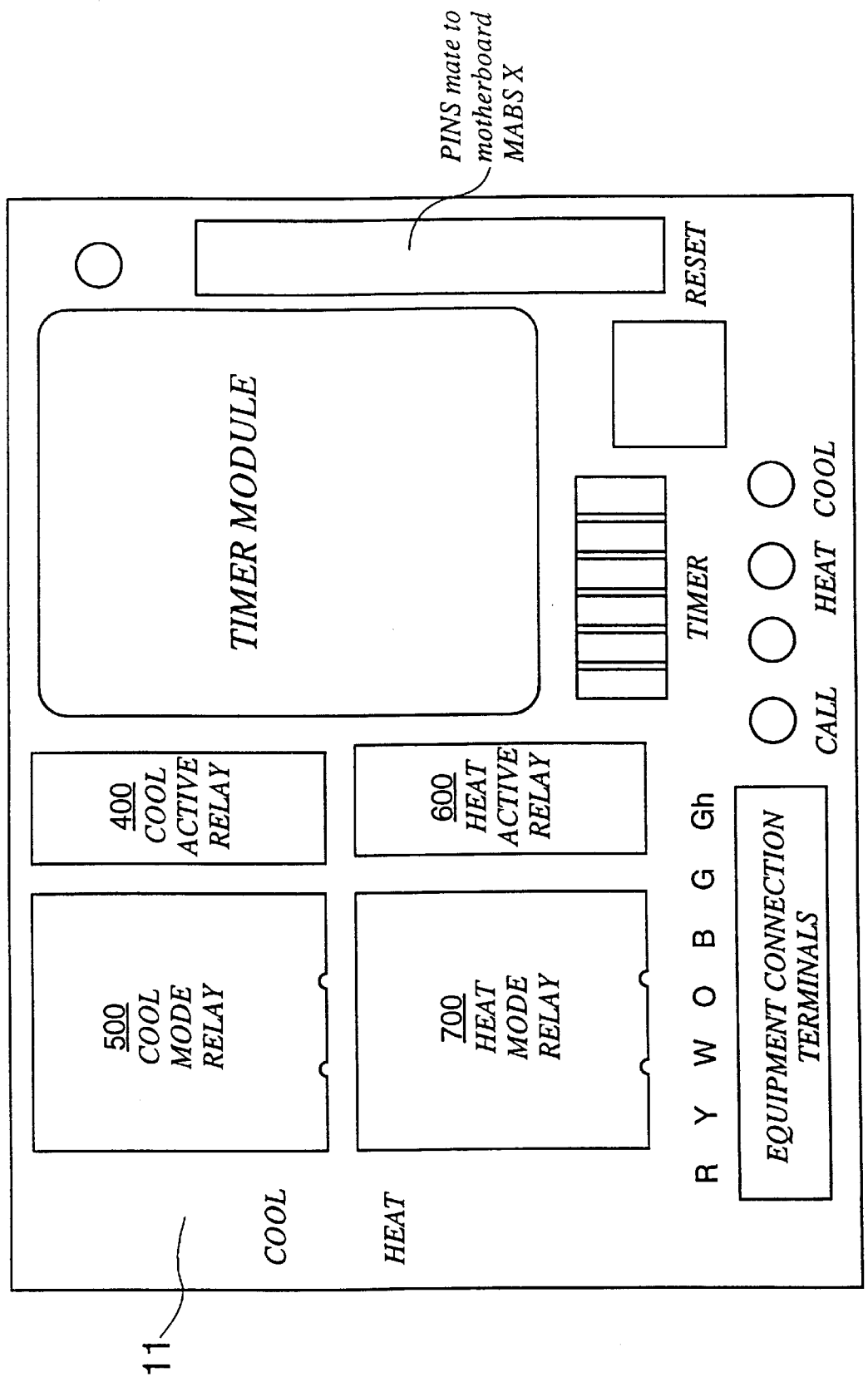
FIG. 12 is a plan view of the master control module.

As shown in FIG. 12, master control module 11 has a cool active relay 400 and a cool mode relay 500. The cool active relay 400 has a first closed contact set 420 with a first terminal 421 connected to the heat allowance bus 12 and a second terminal 422. These terminals 421 and 422 are normally closed, that is when the coil of the relay is not energized, they are connected.

Cool mode relay 500 has a first normally closed contact set 520 with a first terminal 521 connected to the second terminal 422 of the cool active relay. A second terminal 522 of the first contact set 520 of the cool mode relay 500 is electrically connected to a second power terminal or power line 13.

When the thermostat 1 calls for heat, the temperature switching means 2 electrically connects the first power terminal 3 to the heat call terminal 4. The zone heat call relay coil 110 is therefore electrically connected to the first power terminal. If the cool active relay 420 and the cool mode relay 520 are not energized, the closed contact sets 420 and 520 will be electrically connected and current can pass from the first power terminal 3, through the zone heat call relay 110. This will cause the zone heat call relay 100 to be energized. If either of the cool active relay 420 or the cool mode relay 520 is energized, such as when a different zone is being cooled, then no current will flow through the zone heat call relay coil 110, even if the zone thermostat 1 is called for heat. In this way, the control means 10 prevents or blocks heating equipment operation when the system is in a cooling operation. The thermostat 1 and the zone heat call relay 100 for the other zones are connected in a similar fashion to the heat allowance bus 12. In this way, all thermostats which call for heat, are blocked or disabled during a cooling operation. The zone cool call relay 200 is connected to the cool call terminal 5 and the cool allowance bus 14 in a similar manner, in order to achieve a similar effect, except for cooling instead of heating.

The zone fan call relay 300 can have the second terminal 311 of its coil 310 connected to the cool allowance bus 14. Whenever a zone calls for cooling, the fan is automatically operated. The fan can also be operated when neither heating nor cooling is taking place, in order to provide ventilation to the zone. If the heater is a hot air furnace, it is usually desirable that the fan does not operate until the furnace has reached a desired temperature. This prevents cold air from being brought into a zone which calls for heat. Therefore, in the preferred embodiment, the second coil terminal 311 of the zone fan call relay 300 is connected to the cool allowance bus 14 so that the thermostat is prevented from starting the fan while the furnace is not yet up to the desired temperature.

Figure 2:
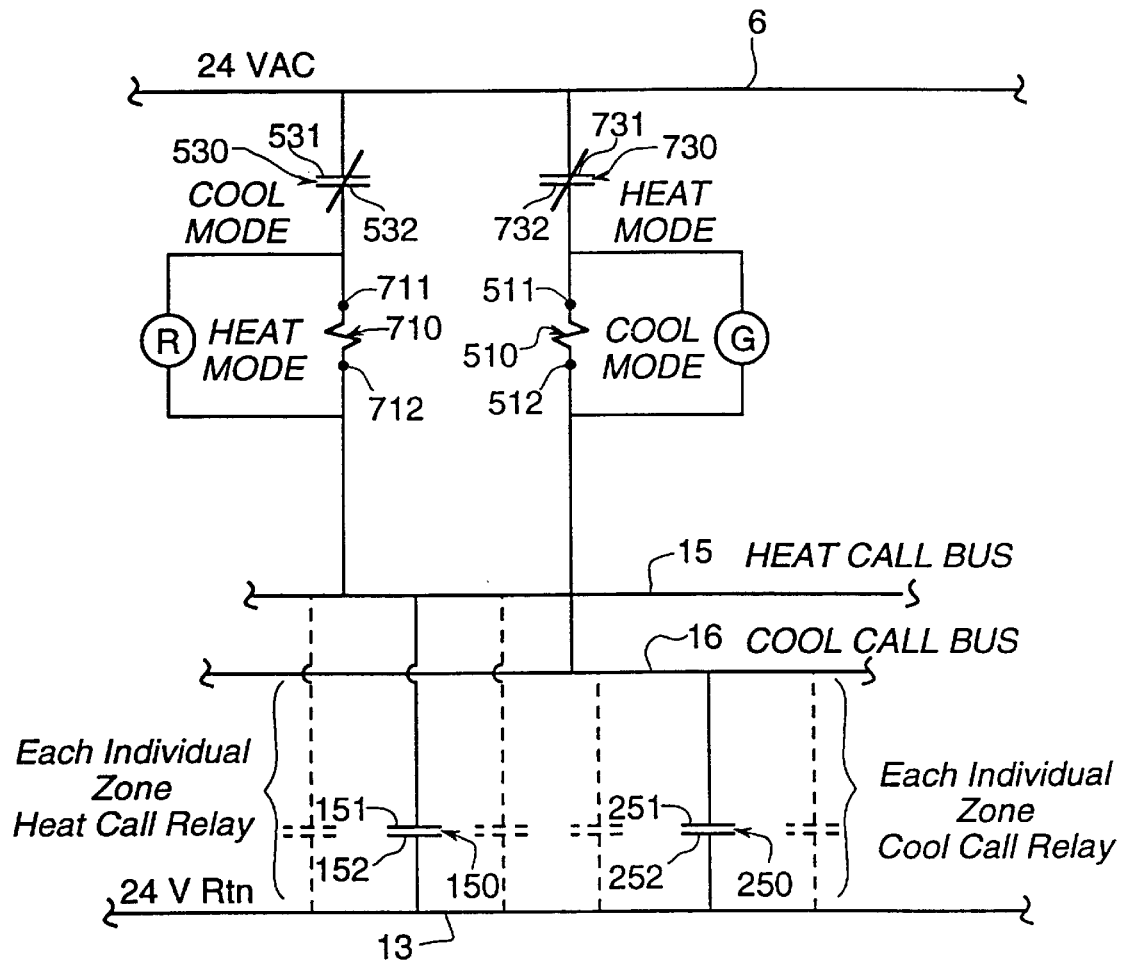
FIG. 2 is a circuit diagram of another part of the master control module and portions of the multi-zone panel.

As shown in FIG. 2, cool mode relay 500 has a second closed contact set 530 with a first terminal 531 connected to the first power line 6. The heat mode relay 700 has a coil 710 with a first terminal 711 connected to the second terminal 532 of the second normally closed contact set 530 of the cool mode relay. The second coil terminal 712 of the heat mode coil 710 is connected to a heat call bus 15.

Each individual zone heat call relay 100 has a first open contact set 150. A first terminal 151 of this first open contact set 150 is connected to the heat call bus 15. A second terminal 152 of this first open contact set 150 is connected to the second power terminal or line 13.

The coil 710 of the heat mode relay 700, therefore will only be energized when the cool mode relay 500 is not energized, and at least one of the zone heat call relays 100 is energized. This insures that the heating equipment, which can be activated by another contact set of the heat mode relay, will not be activated unless a zone is calling for heat and the cooling is not presently operating.

As shown in FIG. 2, a similar circuit in relay logic exists with respect to the cool mode relay coil 510, the second closed contact set 730 of the heat mode relay 700 and the first normally open contact set 250 of the individual zone cool call relay 200, except with regard to cool calls and energizing the cool mode relay 500.

Figure 3:
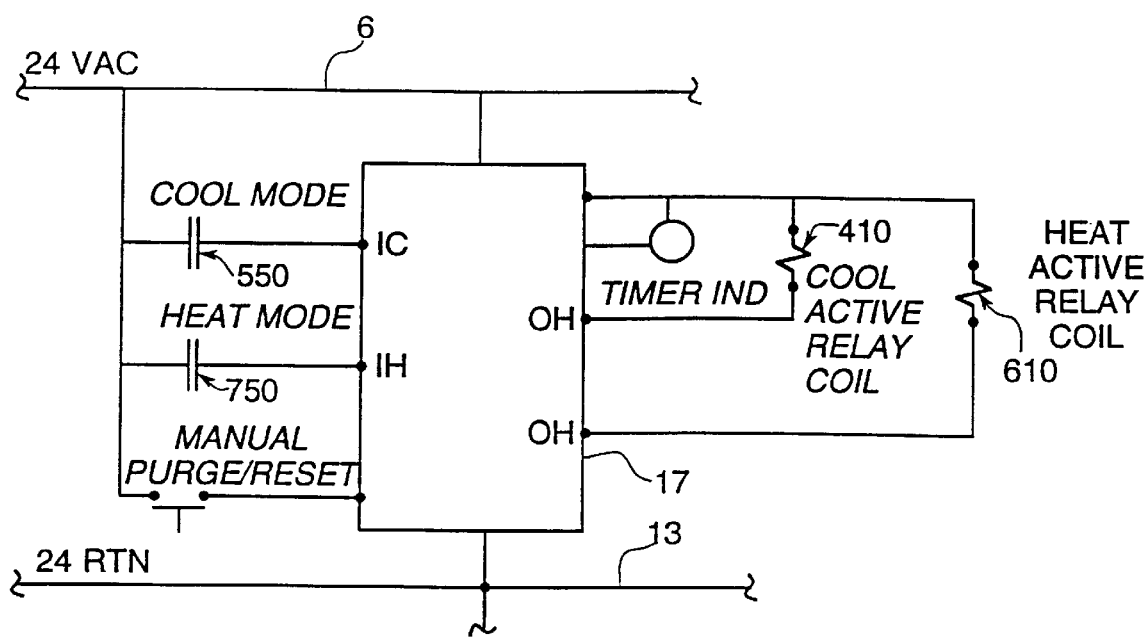
FIG. 3 is a circuit diagram of the timer circuit of the master control module.

FIG. 3 shows the timer means 17 of the master control module 11. The cool mode relay 500 sends a signal to the timer means 17 when the cool mode relay 500 is energized. Likewise, the heat mode relay 700 sends a heat mode signal to the timer 17 when the heat mode relay 700 is energized. The preferred embodiment, this is done with a normally open contact set 550 and 750 of the cool mode and heat mode relays 500 and 700 respectively. When the cool mode and heat mode coils are energized, they apply a voltage and/or current to two separate inputs IC and IH of the timer 17.

The timer 17 has an output terminal OH which generates a heat active signal which can also be thought of as a (cool mode prevention signal), and has another output OC which generates a cool active signal (which can also be thought of as a heat mode prevention signal). These signals energize the coils 410 and 610 of the cool active relay and heat active relay 400 and 600 respectively.

Figure 4:
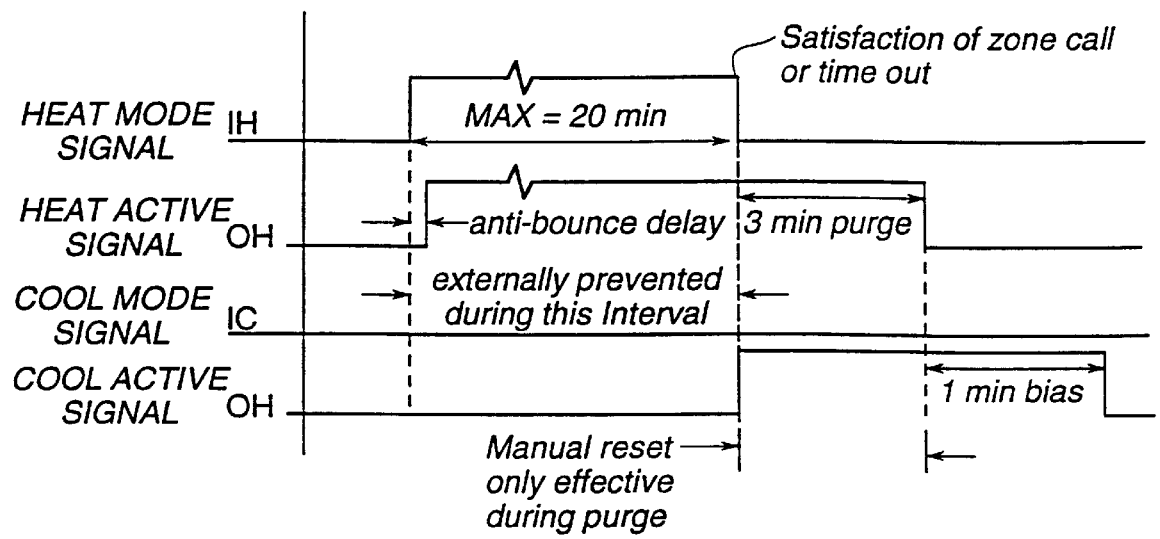
FIG. 4 is a timing diagram of the master control module timer.

FIG. 4 shows a timing diagram of the relationships between the input cool mode and heat mode signals and the output, namely the cool active and heat active signals. When the timer receives the heat mode signal on input IH, the timer 17 generates the heat active signal on OH. If after an adequate length of time, the zone has warmed up and is no longer calling for heat, the thermostat will disconnect the heat call terminal from the first power terminal and correspondingly the zone heat call relay will de-energize. This de-energization of the zone heat call relay 100 will cause the normally open contact set 150 to disconnect and therefore the heat mode relay coil 710 will be de-energized and thus the heat mode signal to the timer means 17 will disappear and both active relays are energized. On the other hand, if a zone is calling for heat for an excessively long period, the control system of the present invention wants to insure that other zones calling for cooling will have a chance to be satisfied without the system being dominated by a zone continuously calling. The timer means 17, therefore either keeps track of the length of time that the system is being dominated by one type of call, or the length of time that a conflicting call has gone unanswered or satisfied. Once this length of time is longer than a maximum period, the zone relays dominating the system are disabled or blocked by energizing the other active relay. When both active relays are energized the fan is run to purge for a specific time, 3 minutes in the present diagram. At the end of the purge the bias period begins. During that time a conflicting high priority heat or cool call is given priority, so that even if an original call was still present the new call relays could activate the system without being blocked by the previously dominating call. During the purge period conditioned air from the previous call is purged from the vents or ducts into the zones of the previous call, as well as normalize the energy source equipment.

This is further clarified in FIG. 4. The timing diagram shows a situation in which the heat mode signal is present for an excessively long time period of 20 minutes. After the timer means 17 has been receiving the heat mode signal for 20 minutes or the zone heat call is satisfied, the timer means then activates or generates the cool active signal in addition to the heat active signal. This cool active signal energizes the cool active relay. This activation or energization opens the first normally closed contact set 420 of the cool active relay and thus the heat zone call relays are disabled. Since all of the zone heat call relays 100 are disabled, the heat mode signal is cancelled or removed.

During the purge period, the timer means 17 keeps the heat active signal and the cool active signal high for the duration of the purge period, which is shown in FIG. 4 to be three minutes. When both the heat active signal and the cool active signal are present, the system is in the purge state. After the purge state, the heat active signal is removed and the cool active signal remains high for the bias period. As stated above, when the cool active signal is high or present, the first normally closed contact set 420 of the cool active relay is open and all the zone heat call relays are disabled. Since in the bias period, the heat active signal is low, all of the zone cool call relays are enabled and therefore any zone calling for cooling will be received or acknowledged by the control means and the control means will then issue a cool mode signal and a cool active signal. The process when a zone has been calling for cooling for an excessively long period is analogous.

Providing structure to satisfy conflicting calls without conflicting operation of heaters and coolers, is only one part of the present invention. The dampers for the individual zones must be properly controlled so that the properly condition air is delivered to the proper zone and zones do not receive air that has been conflictingly conditioned. This becomes especially complicated after the purge period, when each zone is also given the ability to call for fan ventilation and/or the system must also provide for the ability to ventilate the building as a whole.

The first and second thermostats each include a fan switch means for generating a separate fan call signal from each zone. The control means includes a separate system/zone switch means for the first and second zones to generate a zone ventilation signal or a system ventilation signal. The control means also includes an idle switch means switchable between a damper open state and a damper closed state for each of the first and second zones. The control means generates first open and close damper signals and second open and close damper signals, the control means generating the open and close damper signals for corresponding zones in accordance with a logic based on the signals and having a form of OPEN=(A*I')+(B*J')+([A*I']* [B*J']*[K'*C'* {D'*E'*F)}]) CLOSE=A'*B'*K'*(C+[ C'*D'*{ (E'*F')+E}]) where,

* = logical AND function,
+ = logical OR function,
' = signal not present,
A = corresponding zone cool call signal,
B = corresponding zone heat call signal,
C = system CAC=G+H(cool mode OR heat mode)=(I*J') +(J*I')
D = corresponding zone fan call signal
E = fan CAC signal=D* corresponding zone ventilation signal
F = corresponding zone idle switch means in damper open state (F' is closed state),
G = cool mode signal=(A*B'*H')+(G*A*B*MTIME),
H = heat mode signal=(B*A'*G')+(H*A*B*MTIME),
I = heat active signal (cool mode prevention signal)= H+(I*H'*PTIME)+(J*G'*PTIME),
J = cool active signal (heat mode prevention signal)= G+(J*G'*PTIME)+(I*H'*PTIME),
K = purge=I*J (heat active AND cool active),
MTIME=within the maximum time period that the system can be in heat or cool mode,
PTIME=within the purge time period.

A contact set shown in this diagram is a transfer set which consists of a common terminal with a normally closed terminal to which it is connected when the relay is de-energized and to which it is not connected when the relay is energized. The set includes another normally open terminal to which the common terminal is not connected when the relay is de-energized and to which it is connected when the relay is energized.

The figure will be explained in terms of the conditions which allow the damper motor to be energized to open or energized to close or not energized to remain in the last condition. When power from power line 6 reaches the open or close terminal of the motor it provides the power to perform that function since the motor common terminal is connected to the other power line 13.

When there is no call in the zone nor in any other zone and the system is not in purge, the condition is known as Idle. In this condition the position of the damper is determined by the idle position switch, which is generally recommended to be left in Open. The power path is described as follows: the normally closed contacts of the call relays uses the circuit from power line 6 via 221 to 222 of zone cool call contact set 220 to contact set 120 of the zone heat call via 121 to 122 to the set 820 terminal 821 to 822 of the purge relay (not shown in its entirety but which would be energized by the condition of both active relays described in the FIG. 4) thence to the 920 contact set of the System CAC relay using 921 to 922 thence to the 320 contact set of the zone fan relay using 321 to 322 and then to Fan CAC relay contact set 1020 via the 1021 to 1022 to the common 23 of the switch to select the damper idle position, 24 for open or 25 for close.

When either a heat or cool call is made in the zone the damper will be opened regardless of any other condition in the circuit. If there is no heat or cool call in the zone, when there is a call in another zone, then as already described the system CAC relay will be energized which will close this damper since it does not have a matching call. If the call is for heat then the zone cool relay can not be energized as previously described, and visa-versa. At the end of a call, either by being satisfied or by time limit, the purge condition will exist. Since no zone call can exist there is no condition that can pen the damper and the 820 contact set of the purge relay prevents the closing of a damper, all dampers will remain in their last position during the purge.

In the idle condition, a zone fan call will cause the damper to open regardless of its position using the 320 contact set via 321 to 323 of the zone fan call relay. This insures that this zone's damper is open when the fan is turned on.

Figure 5:
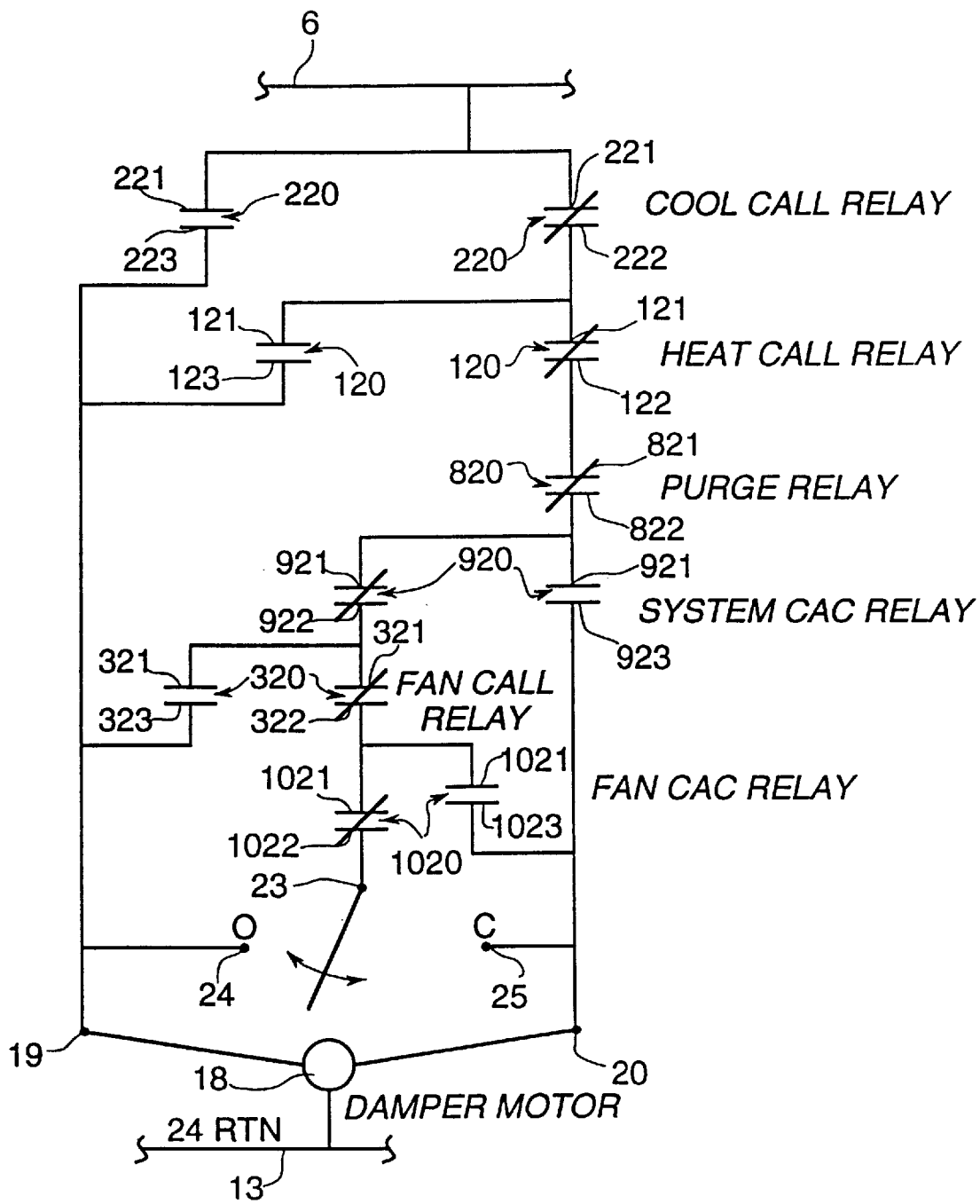
FIG. 5 is a circuit diagram of the relay logic control for each of the dampers of the individual zones located on the multi-zone panel.
Figure 6:
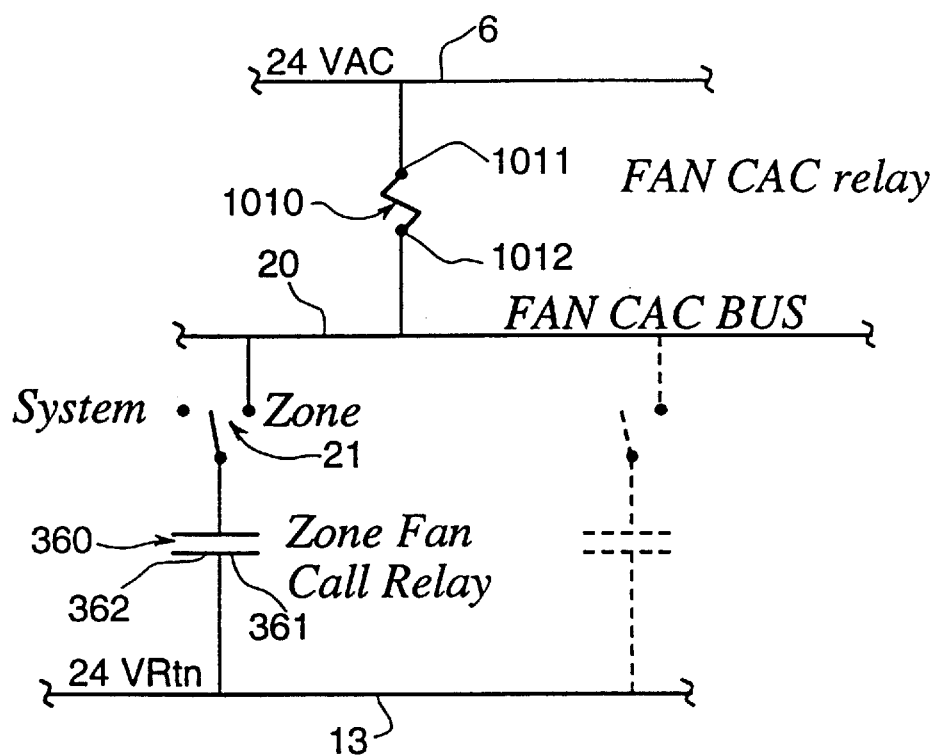
FIG. 6 is a circuit diagram of the system fan relay control.

The fan CAC circuit of FIG. 6 must be explained before proceeding with the FIG. 5 explanation. If the system fan switch 21 is set to the zone position, then the fan CAC relay will be energized when there is a power circuit from power line 6 through the coil 1010 of the fan CAC relay to the fan CAC bus 20 via the switch 21, in the Zone position, and the contact set 360 using 361 to 362 of the zone fan call relay. Thus the fan CAC relay operates only if a zone thermostat fan switch operates the zone fan call relay in a zone which has the system/zone switch set to zone.

The fan CAC relay will now cause the following operation in FIG. 5. If the zone fan call relay is not for this zone then the damper in this zone will be closed via the circuit to the 1020 contact set of the fan CAC relay via 1021 to 1023. On the other hand if the zone fan relay for the zone is energized, then the damper will be opened as described before. In this way, when a zone is defined at installation as a Zoned ventilation (fan) zone then its thermostat fan switch will cause all dampers in zones that do not have their fan switch ON to close. A zone that has its fan switch ON will cause the zone fan call relay for that zone to be energized, which will cause the damper of that zone to be opened, and not closed by the fan CAC relay.

Figure 7:
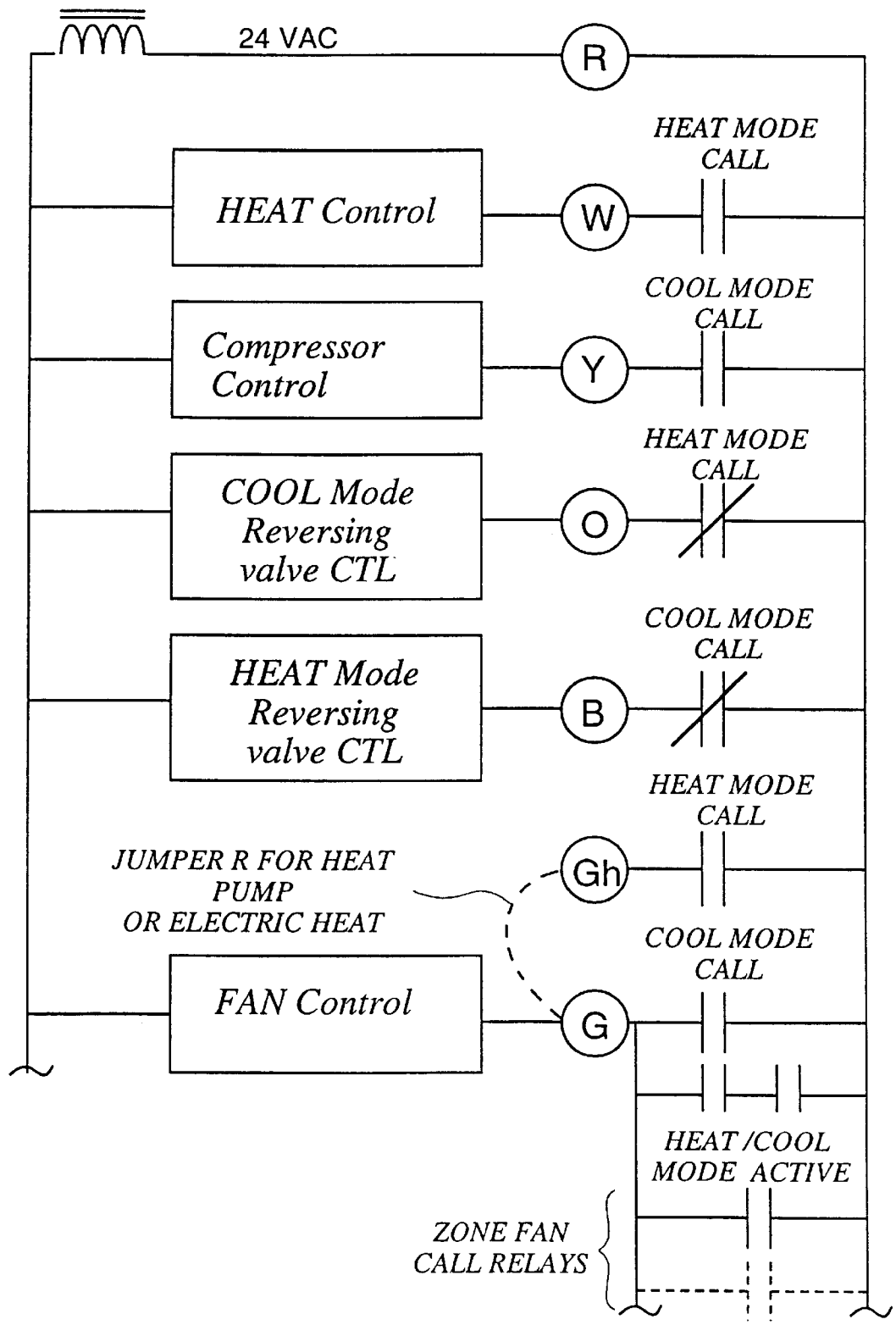
FIG. 7 is a circuit diagram of the master control module interface to the heating, cooling and ventilating equipment.

FIG. 7 shows other contact sets of the relays which connect to terminal on the control means which then can be connected to the actual heating and cooling equipment as well as the fan equipment.

Figure 8:
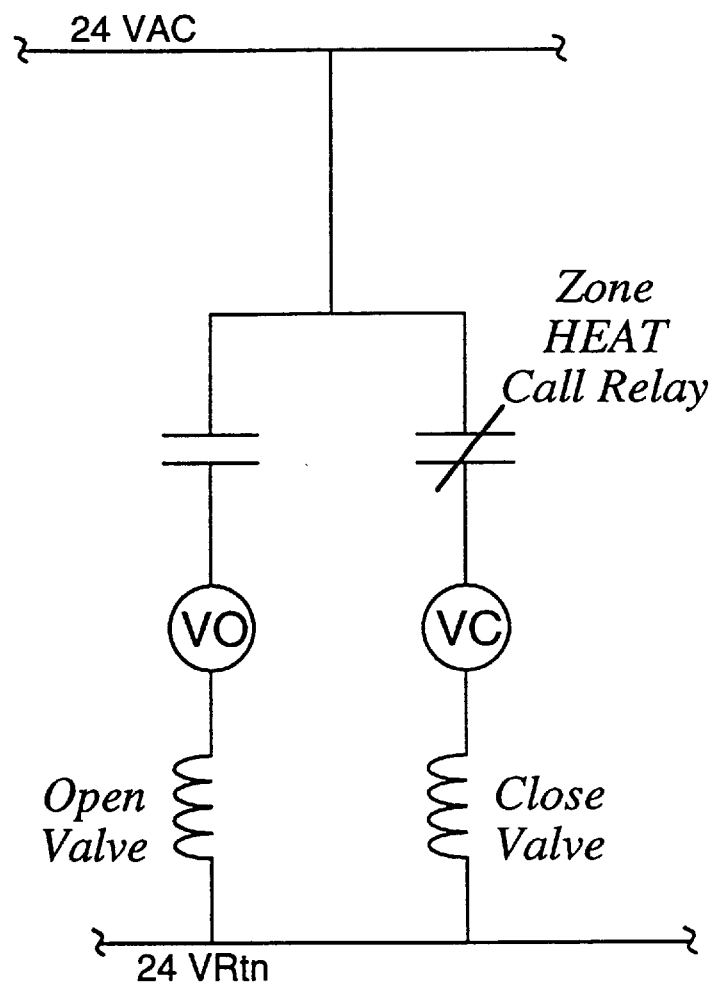
FIG. 8 is a circuit diagram of an interface between the master control module and a hydronic heating system.

FIG. 8 shows the circuitry for the control system of the present invention to operate hydronic valves for heating, in the zone.

The control system and packaging method allows the almost unlimited expansion of zones utilizing the same three zone panel, without an MCM, to provide each three zone increment. Each panel transformer provides the power for its own thermostats, damper and relay equipment, while the first panel also provides the power for the MCM.

Each zone can operate with either a Single set point thermostat with a switching subbase, or a Dual set point thermostat with an AUTO position subbase or without any subbase (and therefore no independent fan control).

The MCM provides prevention of conflicting calls, limit on how long such call can control the equipment, continuation of fan operation for a timed period (purge) to stabilize the equipment after loss of the call (either by satisfaction or excess time), a minor delay (bias) to allow the opposite call to have an opportunity to take control before allowing another similar call or the return to Idle or one of the ventilating modes.

The ventilating modes of the system are also unique in their application to different types of premises. A panel mounted switch allows a choice, at the time of installation, of how the thermostat FAN switch will control the fan. The FAN switch at each thermostat can be used to provide system ventilation to those zones that have their dampers Open in Idle or have their FAN switches ON; or provide ventilation to only those zones that have their FAN switches ON.

In addition it can also operate zones that contain Hydronic valves, for either Baseboard or water coils in the ducts, without the need for auxiliary relays. It can do this as either first stage or second stage Heat. The MCM panel can provide FAN operation in the heat mode if necessary. Normal operation requires FAN operation with a Cool call. The MCM panel allows either two different speed calls or one speed call for the cool or heat modes.

Figure 9A:
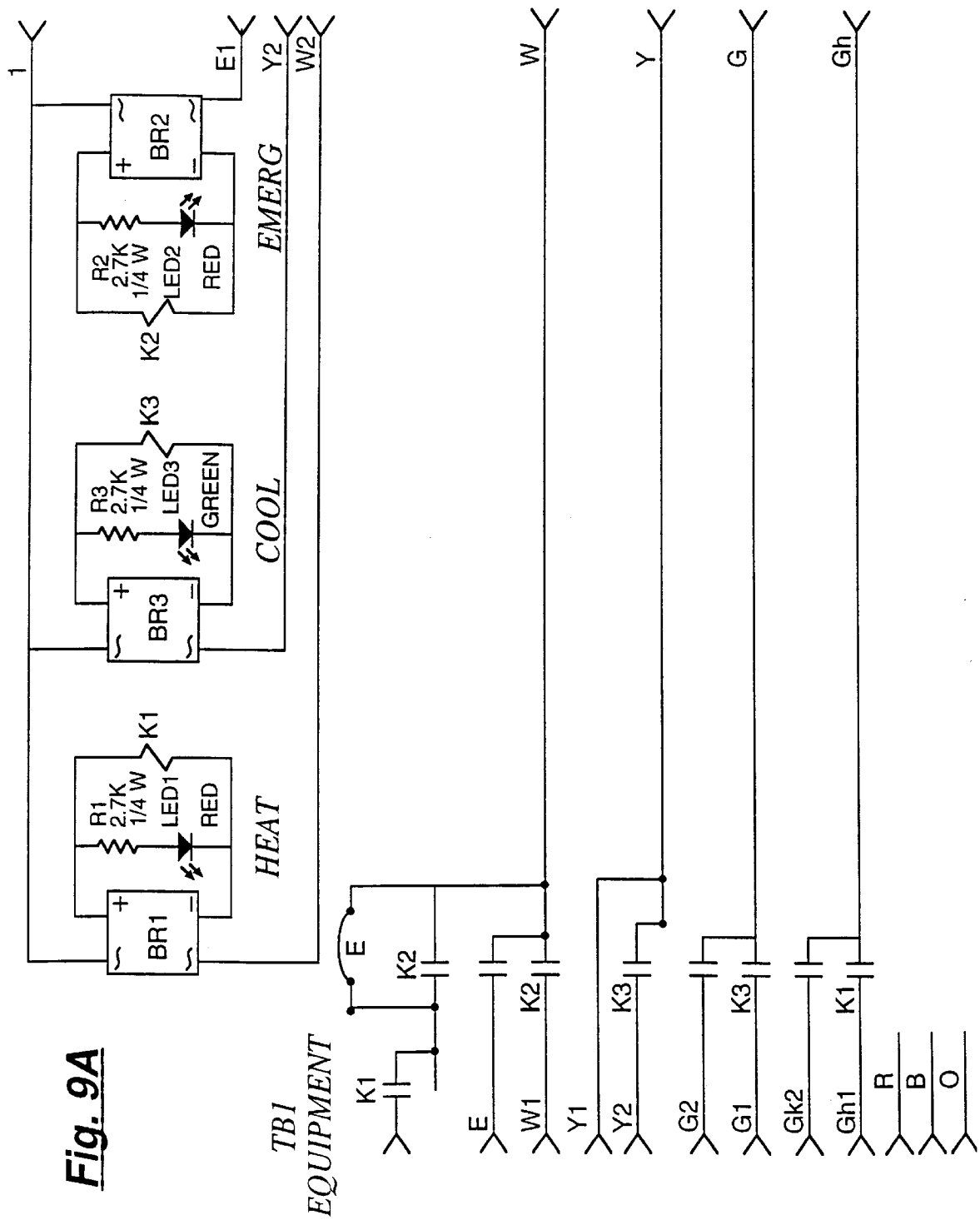
FIG. 9a is the auxiliary panel (MHP) used when the equipment for heating and cooling is either 2 stage or a heat pump with multi-stage equipment.
Figure 9B:
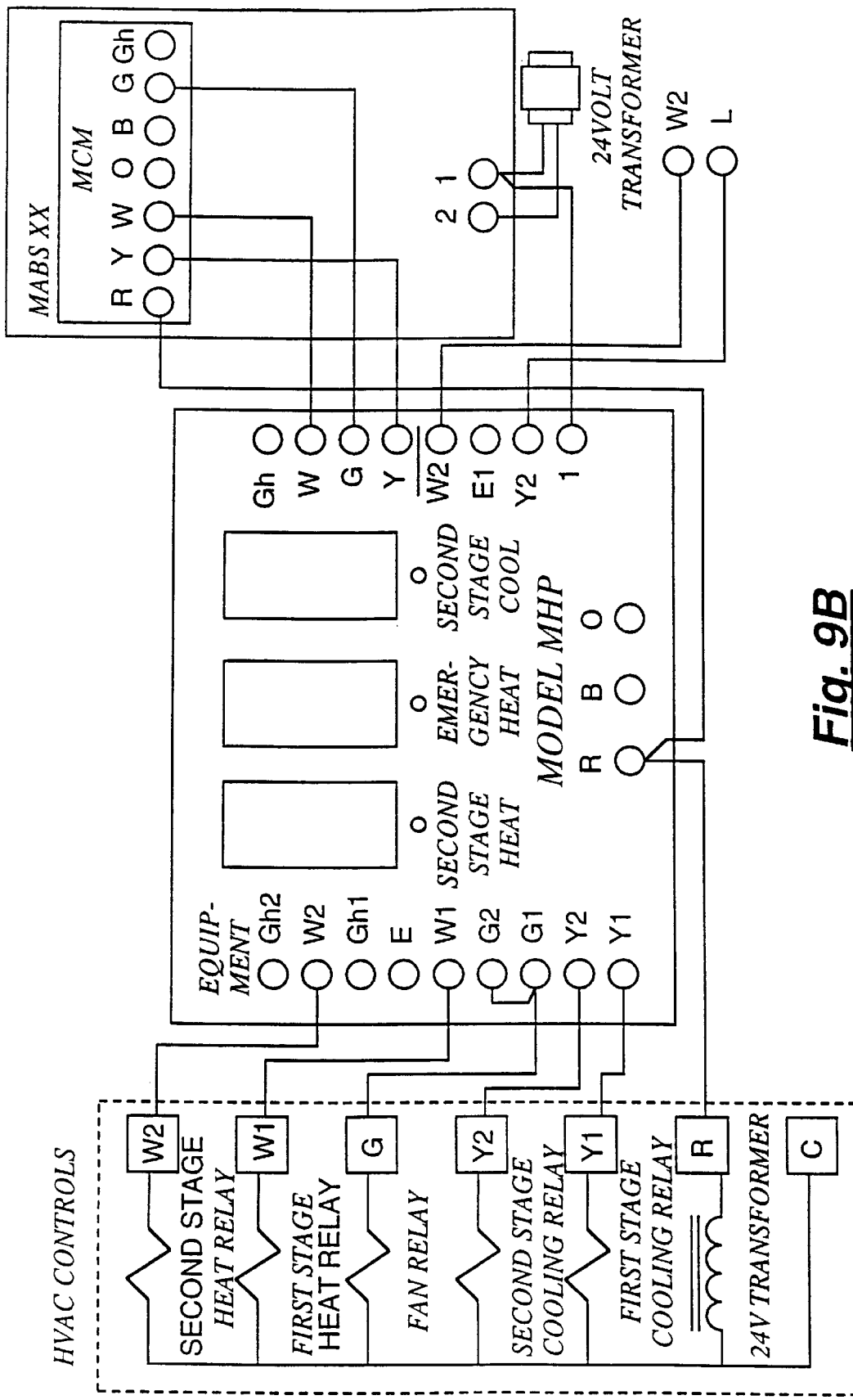
FIG. 9b shows how the auxiliary panel (MHP) would be used for multi-stage.
Figure 9C:
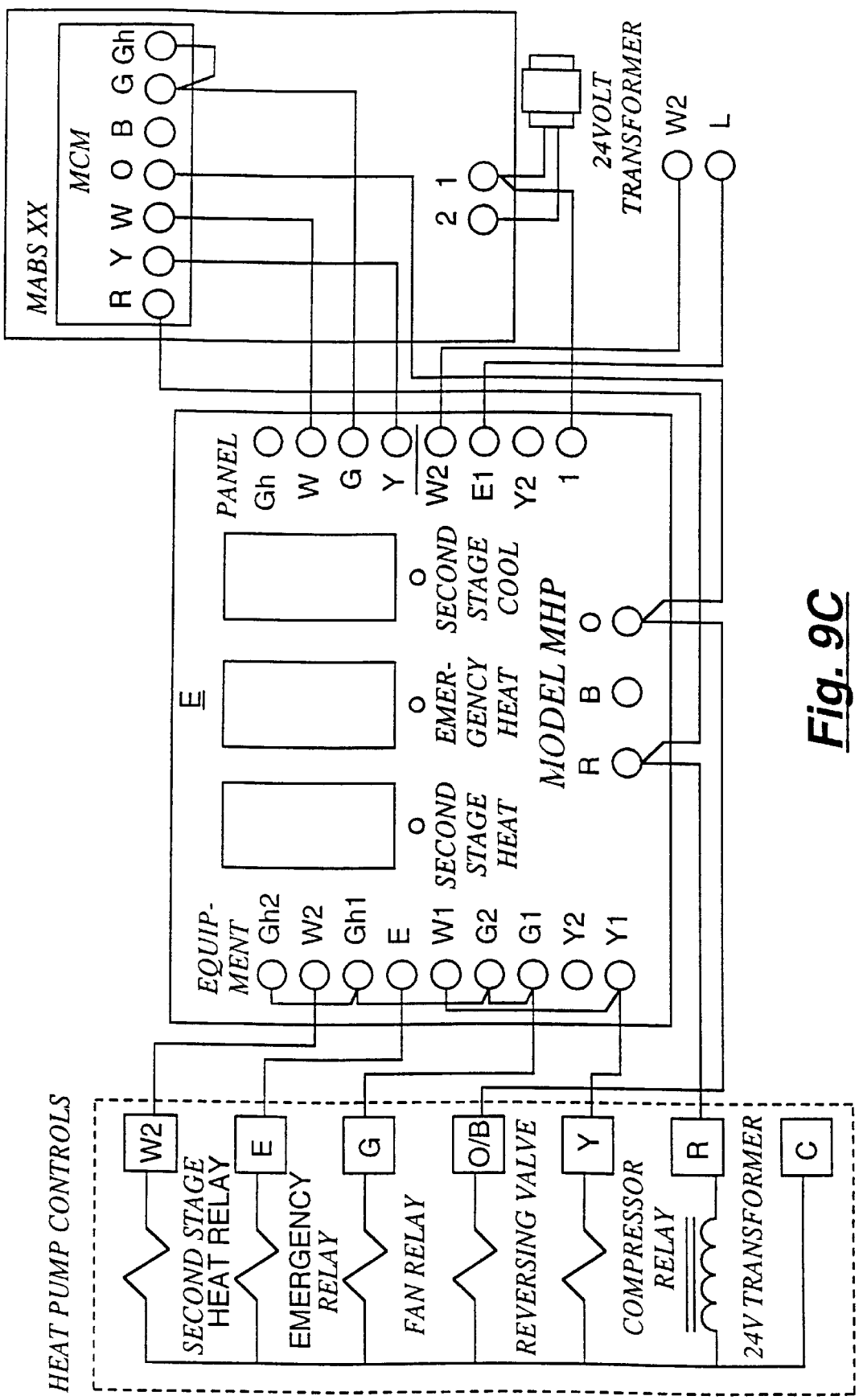
FIG. 9c shows how the auxiliary panel (MHP) would be used for a heat pump.

The operational auxiliary Panel known as MHP shown in detail in FIG. 9A provides the Multi-stage for two stage equipment as well as auxiliary heat and emergency heat for heat pumps. It does this with the ability to provide up to four fan speed calls that might be required. This panel does not require a transformer. It uses power from each panel. The detail connection from the MCM via the MHP for 2 stage equipment is shown in FIG. 9B. FIG. 9C is the detail for the MCM to heat pump via the MHP.

A control system of the present invention, due to its many different input possibilities can exist in many different states or levels. Some states such as heating or cooling, have higher priorities than other states such as idle or ventilation. If a system is in idle or ventilation, and input parameters have changed to cold or heat calls, the system switches from the ventilation level to the heat level. Likewise if the system is in heat, and receives a ventilation call, the system does not switch to ventilation since the heat state or level has a higher priority. Also, once the system is in certain states such as heat or cool, it cannot directly switch to other system states such as ventilation or idle, but instead must pass through the states of purge and bias. The following is a description of the different states or levels that the control system of the present invention can be in, and the description of a priority and abilities.

LEVELS OF OPERATION:

A higher level overrides a lower level.
Level 0: SYSTEM IDLE;
    Can exit to any level.
<No heat or cool call: All subbase FAN switches in AUTO.
=Equipment: Idle. All Hydronic valves closed.
=Dampers: open if zone switch is (O), closed if (C).
Level 1: SYSTEM VENTILATION:
    Can exit to any level.
<No heat or cool call: A Zone subbase FAN switch is ON with its panel Fan switch in SYSTEM.
    =Equipment: FAN on.
=Damper in zone with FAN ON: open.
=Dampers (all other): open if zone switch is (O), closed if (C).
Level 2: ZONE VENTILATION:
    Can exit to any level.
<No heat or cool call: A Zone subbase FAN switch is ON with its panel Fan switch in ZONE
=Equipment: FAN on.
=Damper in zone with FAN ON: open
=Dampers (all others): open in any zone with FAN ON call, closed in all others.
Level 3: HEAT OR COOL
Can only EXIT via Level 4; cannot switch to other call without exiting through Level 4.
<Any zone: First call received.
    HEAT CALL: [20 minutes max or 20 minutes max after cool call.]
=Equipment: BEAT on and the Gh terminal can run the fan, if wired, instead of the plenum switch. Note that if Gh is not used and a heat call occurs during a fan call, the fan will turn off until the plenum comes up to temperature.
=Hydronic valve in zone open; all other valves closed.
=Damper open in any zone with heat call, closed in all others.
    COOL CALL: [20 minutes max or 20 minutes max after heat call.]
=Equipment: Compressor and FAN on.
=Damper open in any zone with cool call, closed in all others.
=Hydronic valves in all zones closed.
Level 4 PURGE & BIAS:
    Can exit to any level.
- PURGE: Three minute time delay after any Level 3 call is satisfied.
- BIAS: One minute priority for opposite mode after PURGE time.
=Equipment: FAN on.
=Dampers: open if switch is (O), closed if (C) or open if last calling zone, closed otherwise.

OPERATING CONDITION:

On receipt of a call, the mode is established. The equipment is activated with the proper fan response required. The timing module blocks the opposite mode and prepares for the purge & bias mode. This latter process is done in such a way as to prevent race conditions from interfering with the transition to purge and later to bias mode. This is a key part of the timing module design. FIG. 10 shows a series of events in the sequence for a 4 Zone system in which each zone has been preset to different conditions, for the sake of displaying the operations, rather than describing a real installation.

While specific embodiments of the invention have been shown and described in detail to illustrate the application of the principles of the invention, it will be understood that the invention may be embodied otherwise without departing from such principles.

What is claimed is:
1. A climate control system comprising:
    a first zone;
    a first thermostat positioned in said first zone, said first thermostat including temperature switch means for generating a cool call signal when a temperature in said first zone is above a first predetermined value, said temperature switch means generating a heat call signal when a temperature in said first zone is below a second predetermined value;
    a second zone;
    a second thermostat positioned in said second zone, said thermostat including temperature switch means for generating a cool call signal when a temperature in said second zone is above another first predetermined value, said temperature switch means generating a heat call signal when a temperature in said second zone is below another second predetermined value;

control means for receiving said cool call signals and said heat call signals from said first and second thermostats, said control means generating a cool mode signal if one of said cool call signals is received before one of said heat call signals, said control means blocking generation of said heat mode signal when said cool mode signal is generated, said control means also generating a heat mode signal if one of said heat call signals is received before one of said cool call signals, said control means blocking generation of said cool mode signal when said mode signal when said heat mode signal is generated;

said control means generating first open and close damper signals and second open and close damper signal, said control means generating said open damper signals when a corresponding zone generates a call signal corresponding to a present mode signal, said control means generating said close damper signals when a corresponding zone generates a call signal contrary to said present mode signal;

said first and second thermostats include a first power terminal, a heat call terminal and a cool call terminal, said temperature switch means of said first and second thermostats connects said first power terminal to said heat call terminal when said temperature in a respective zone is below a respective predetermined value, said temperature switch means of said first and second thermostats connects said first power terminal to said cool terminal when said temperature in said respective zone is above said respective predetermined value;

said control means includes a multi-zone panel means with a first zone heat call relay, a first zone cool call relay, a second zone heat call relay and a second zone cool call relay, said first zone heat call relay having a first coil terminal connected to said heat call terminal of said first thermostat and a second coil terminal connected to a heat allowance bus, said second zone heat call relay having a first coil terminal connected to said heat call terminal of said second thermostat and a second coil terminal connected to said heat allowance bus, said first zone cool call relay having a first coil terminal connected to said cool call terminal of said first thermostat and a second coil terminal connected to a cool allowance bus, said second zone cool call relay having a first coil terminal connected to said cool call terminal of said second thermostat and a second coil terminal connected to said cool allowance bus:

said control means also includes a master control module having a heat mode relay, a cool mode relay, a heat active relay and a cool active relay, said heat mode relay having a first normally closed contact set with a first terminal connected to said cool allowance bus and a second terminal, said heat active relay having a first normally closed contact set with a first terminal connected to said second terminal of said heat mode relay and a second terminal connected to a second power terminal, said cool mode relay having a first normally closed contact set with a first terminal connected to said heat allowance bus and a second terminal, said cool active relay having a first normally closed contact set with a first terminal connected to said second terminal of said cool mode relay and a second terminal connected to said second power terminal.

2. A climate control system in accordance with claim 1, wherein:
said first and second thermostats each include fan switch means for generating a separate fan call signal from each zone;
said control means blocking generation of said fan call signals when one of said heat mode signal and said heat active signal are generated, said control means receiving and generating a fan mode signal if neither of said heat mode and said cool mode signals are present.

3. A climate control system in accordance with claim 1, wherein:
said control means includes a separate system/zone switch means for said first and second zones to generate a zone ventilation signal or a system ventilation signal, said control means generating said close damper signals for corresponding zones not generating said fan call signal when said zone ventilation signal is present.

4. A climate control system in accordance with claim 1, wherein:
said control means includes a timer means for receiving said heat mode call signal and said cool mode call signal, and for generating a cool active signal when receiving said cool mode signal, said timer means also generating a heat active signal when receiving said heat mode signal;
said control means blocking said heat call signal from said first and second thermostats when said control means is generating one of said cool mode signal and said cool active signal, said control means also blocking said cool call signal from said first and second thermostats when said control means is generating one of said heat mode signal and said heat active signal.

5. A climate control system in accordance with claim 4, wherein:
said timer means generates both said cool active signal and said heat active signal substantially immediately after one of said heat and cool mode signals has been removed, said generating of said both active signals existing for a purge period to remove residual heat.

6. A climate control system in accordance with claim 4, wherein:
said timer means generating both said cool active signal and said heat active signal after one of said mode signals has been generated for longer than a predetermined max time, said generating of said both cool and heat active signals blocking generation of said mode signals, said generating of said both active signals existing for a purge period to remove residual heat.

7. A climate control system in accordance with claim 4, wherein:
said timer means generating both said cool active signal and said heat active signal after one of said mode signals has been blocked for longer than a predetermined max time, said generating of said both cool and heat active signals blocking generation of said mode signals, said generating of said both active signals existing for a purge period to remove residual heat.

8. A climate control system in accordance with claim 4, wherein:
said timer means generates said cool active signal after said heat mode signal has been generated for longer than a predetermined max period, said generating of said cool active signal removing said heat mode signal, said timer means removing said heat active signal after said max period and continuing to generate said cool active signal for a bias period to block generation of said heat call signals, and to enable generation of said cool call signals and generation of said cool mode signal during said bias period.

9. A climate control system in accordance with claim 4, wherein:

said timer means generates said cool active signal after said cool mode signal has been blocked for longer than a predetermined max period, said generating of said cool active signal removing said heat mode signal, said timer means removing said heat active signal after said max period and continuing to generate said cool active signal for a bias period to block generation of said heat call signals, and to enable generation of said cool call signals and generation of said cool mode signal during said bias period.

10. A climate control system in accordance with claim 4, wherein:

said first and second thermostats each include fan switch means for generating a separate fan call signal from each zone;

said control means includes a separate system/zone switch means for said first and second zones to generate a zone ventilation signal or a system ventilation signal, said control means includes an idle switch means switchable between a damper open state and a damper closed state for each of said first and second zones;

said control means generating said open and close damper signals for corresponding zones in accordance with a logic based on said signals and having a form of OPEN=(A*I')+(B*J')+([A*I']*[B*J']*[K'*C'*{D+ (D'*E'*F)}])) CLOSE=A'*B'*K'*(C+[C*D'*{ (E'*F') +E]) where,

*=logical AND function,

+=logical OR function,

'=signal not present,

A=corresponding zone cool call signal,

B=corresponding zone heat call signal,

C=system CAC=G+H(cool mode OR heat mode)=(I*J') +(J*I')

D=corresponding zone fan call signal

E=fan CAC signal=D* corresponding zone ventilation signal

F=corresponding zone idle switch means in damper open state (F' is closed state), G=cool mode signal=(A*B'*H')+(G*A*B*MTIME), H=heat mode signal=( B*A'*G')+( H*A*B*MTIME), I=heat active signal (cool mode prevention signal)=H+ (I*H'*PTIME)+(J*G'*PTIME), J=cool active signal (heat mode prevention signal)=G+ (J*G'*PTIME)+(I*H'*PTIME), K=purge=I*J'(heat active AND cool active), MTIME=within maximum time period that the system can be in heat or cool mode, PTIME=within purge time period.

11. A climate system comprising:

a first zone;

a first thermostat positioned in said first zone, said first thermostat including temperature switch means for generating a cool call signal when a temperature in said first zone is above a first predetermined value, said temperature switch means generating a heat call signal when a temperature in said first zone is below a second predetermined value;

a second zone;

a second thermostat positioned in said second zone, said thermostat including temperature switch means for generating a cool call signal when a temperature in said second zone is above another first predetermined value, said temperature switch means generating a heat call signal when a temperature in said second zone is below another second predetermined value;

control means for receiving said cool call signals and said heat call signals from said first and second thermostats, and for generating a cool mode signal when receiving said cool call signal from one of said first and second thermostats and not receiving said heat call signals, said control means blocking generation of a heat mode signal when said cool mode signal is generated, said control means also generating said heat mode signal when receiving said heat call signal from one of said first and second thermostats and not receiving said cool call signals, said control means blocking generation of said cool mode signal when said heat mode signal is generated;

said first and second thermostats include a first power terminal, a heat call terminal and a cool call terminal, said temperature switch means of said first and second thermostats connects said first power terminal to said heat call terminal when said temperature in a respective zone is below a respective predetermined value, said temperature switch means of said first and second thermostats connects said first power terminal to said cool call terminal when said temperature in said respective zone is above said respective predetermined value;

said control means includes a multi-zone panel means with a first zone heat call relay, a first zone cool call relay, a second zone heat call relay and a second zone cool call relay, said first zone heat call relay having a first coil terminal connected to said heat call terminal of said first thermostat and a second coil terminal connected to a heat allowance bus, said second zone heat call relay having a first coil terminal connected to said heat call terminal of said second thermostat and a second coil terminal connected to said heat allowance bus, said first zone cool call relay having a first coil terminal connected to said cool call terminal of said first thermostat and a second coil terminal connected to a cool allowance bus, said second zone cool call relay having a first coil terminal connected to said cool call terminal of said second thermostat and a second coil terminal connected to said cool allowance bus;

said control means also includes a master control module having a heat mode relay, a cool mode relay, a heat active relay and a cool active relay, said heat mode relay having a first normally closed contact set with a first terminal connected to said cool allowance bus and a second terminal, said heat active relay having a first normally closed contact set with a first terminal connected to said second terminal of said heat mode relay and a second terminal connected to a second power terminal, said cool mode relay having a first normally closed contact set with a first terminal connected to said heat allowance bus and a second terminal, said cool active relay having a first normally closed contact set with a first terminal connected to said second terminal of said cool mode relay and a second terminal connected to said second power terminal.

12. A climate control system in accordance with claim 11, wherein:

said cool mode relay has a second normally closed contact set with a first terminal connected to said first power terminal and a second terminal, a first coil terminal of said heat mode relay being connected to a heat call bus, said first zone heat call relay having a first normally open contact set with a first terminal connected to said heat call bus and a second terminal connected to said second power terminal, said second zone heat call relay having a first normally open contact set with a first terminal connected to said heat call bus and a second terminal connected to said second power terminal;

said heat mode relay has a second normally closed contact set with a first terminal connected to said first power terminal and a second terminal, a first coil terminal of said cool mode relay being connected to a cool call bus, said first zone cool call relay having a first normally open contact set with a first terminal connected to said cool call bus and a second terminal connected to said second power terminal, said second zone cool call relay having a first normally open contact set with a first terminal connected to said cool call bus and a second terminal connected to said second power terminal.

13. A climate control system in accordance with claim 12, wherein:

conductivity of said first coil terminal of said cool mode relay with said first power terminal and conductivity of said second coil terminal of said cool mode relay with said second power terminal generates said cool mode signal;

conductivity of said first coil terminal of said heat mode relay with said first power terminal and conductivity of said second coil terminal of said heat mode relay with said second power terminal generates said heat mode signal;

said cool active signal energizes said cool active relay;

said heat active signal energizes said heat active relay.

14. A climate control system in accordance with claim 12, wherein:

each of said first and second thermostats include a fan call terminal and fan switch means for generating a fan call signal, said fan switch means connects said first power terminal to said fan call terminal;

a first damper is connected to said first zone, said first damper being movable between an open position and a closed position, said first damper having a close terminal which closes said first damper when said close terminal is connected to said first power terminal, said first damper having an open terminal which opens said first damper when said open terminal is connected to said first power terminal;

a second damper is connected to said second zone, said second damper being movable between an open position and a closed position, said second damper having a close terminal which closes said second damper when said close terminal is connected to said first power terminal, said second damper having an open terminal which opens said second damper when said open terminal is connected to said first power terminal;

said first zone cool call relay includes a second normally open contact set with a first terminal connected to said first power terminal and a second terminal connected to said open terminal of said first damper, said first zone cool call relay also includes a first normally closed contact set with a first terminal connected to said first power terminal and a second terminal;

said first zone heat call relay includes a second normally open contact set with a first terminal connected to said second terminal of said first zone cool call relay first normally closed contact set and a second terminal connected to said open terminal of said first damper, said first zone heat call relay also includes a first normally closed contact set with a first terminal connected to said second terminal of said first zone cool call relay first normally closed contact set and a second terminal;

said cool active relay includes a second normally closed contact set with a first terminal connected to said second terminal of said first normally closed contact set of said first zone heat call relay and a second terminal;

said heat active relay includes a second normally closed contact set with a first terminal connected to said second terminal of said second normally closed contact set of said cool active relay and a second terminal;

said multi-zone panel means includes a system CAC, said system CAC relay including a first coil terminal connected to said first power terminal and a second coil terminal connected to one of a first terminal of a fan normally open contact set of said heat mode relay and said cool mode relay, said system CAC relay including a normally closed contact set with a first terminal connected to said second terminal of said second normally closed contact set of said heat active relay and a second terminal connected to said close terminal of said first damper, said system CAC relay including a normally open contact set with a first terminal connected to said second terminal of said second normally closed contact set of said heat active relay and a second terminal;

said multi-zone panel means includes a first zone fan relay, said first zone fan relay including a first coil terminal connected to said fan call terminal of said first thermostat and a second coil terminal connected to said cool allowance bus, said first zone fan relay including a normally closed contact set with a first terminal connected to said second terminal of said normally closed contact set of said system CAC relay and a second terminal, said first zone fan relay including a normally open contact set with a first terminal connected to said second terminal of said normally closed contact set of said system CAC relay and a second terminal connected to said open terminal of said first damper;

said multi-zone panel means includes a system fan bus;

said multi-zone panel means includes a system fan relay, said system fan relay including a first coil terminal connected to said first power terminal and a second coil terminal connected to said system fan bus, said system fan relay including a normally closed contact set with a first terminal connected to said second terminal of said normally closed contact set of said first zone fan relay and a second terminal, said system fan relay including a normally open contact set with a first terminal connected to said second terminal of said normally closed contact set of said first zone fan relay and a second terminal connected to said close terminal of said first damper;

said multi-zone panel means including an idle switch having a first throw terminal connected to said open terminal of said first damper and a second throw terminal connected to said close terminal of said first damper, said idle switch also having a pull terminal connected to said second terminal of said normally closed contact set of said system fan relay;

said multi-zone panel means includes a second zone fan relay, said second zone fan relay including a first coil terminal connected to said fan call terminal of said second thermostat and a second coil terminal connected to said cool allowance bus, said second zone fan relay including a normally opened contact set with a first terminal connected to said second power terminal and a second terminal;

said multi-zone panel means includes a system/zone switch with a first terminal connected to said second terminal of said normally open contact set of said second zone fan relay, and a second terminal connected to said system fan bus.

15. A climate control system in accordance with claim 11, wherein:

each of said first and second thermostats include a fan call terminal and fan switch means for generating a fan call signal;

a first damper is connected to said first zone, said first damper being movable between an open position and a closed position;

a second damper is connected to said second zone, said second damper being movable between an open position and a closed position;

said control means receiving said fan call signals from said first and second thermostats, said control means including system/zone switch means for selectively generating a zone only fan signal for each of said fan call signals, said control means opening said first damper when receiving one of said first heat or cool call signals, said control means closing said first damper when generating one of said heat or cool mode signals and not receiving one of said first heat or cool call signals, said control means placing said first damper in a ventilation state when said control means is not generating one of said heat or cool mode signals and not receiving one of said first heat or cool call signals, said control means opening said first damper when said first damper is in said ventilation state and receiving said fan call signal from said first thermostat, said control means closing said first damper when said first damper is in said ventilation state, not receiving said fan call signal from said first thermostat and generating said zone only fan signal from said second thermostat.

16. A climate control system in accordance with claim 15, wherein:

said control means has a purge period, and said control means maintains a position of said first and second dampers constant from an immediately previous period though said purge period.

* * * * *